US011153422B2

(12) United States Patent
Mifune et al.

(10) Patent No.: US 11,153,422 B2
(45) Date of Patent: Oct. 19, 2021

(54) FIXING STRUCTURE FOR PLATE-SHAPED MEMBER, AND ELECTRONIC APPARATUS

(71) Applicant: SHARP KABUSHIKI KAISHA, Osaka (JP)

(72) Inventors: Masayuki Mifune, Sakai (JP); Kouki Satou, Sakai (JP); Kouhei Wada, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/009,499

(22) Filed: Sep. 1, 2020

(65) Prior Publication Data

US 2021/0084135 A1 Mar. 18, 2021

(30) Foreign Application Priority Data

Sep. 13, 2019 (JP) ............................ JP2019-167564

(51) Int. Cl.
*H04B 1/38* (2015.01)
*H04M 1/02* (2006.01)

(52) U.S. Cl.
CPC ......... *H04M 1/0249* (2013.01); *H04M 1/026* (2013.01)

(58) Field of Classification Search
CPC .. H04M 1/0249; H04M 1/026; H04M 1/0254; H04M 1/0277; H04M 1/23
See application file for complete search history.

(56) References Cited

U.S. PATENT DOCUMENTS

2013/0169575 A1* 7/2013 Masuda .................. G06F 3/041 345/173
2014/0218878 A1* 8/2014 Choi ....................... G06F 1/188 361/752

FOREIGN PATENT DOCUMENTS

JP 5654146 B2 1/2015

* cited by examiner

*Primary Examiner* — Tuan Pham
(74) *Attorney, Agent, or Firm* — ScienBiziP, P.C.

(57) ABSTRACT

A fixing structure for a plate-shaped member is configured such that before the plate-shaped member and a case are fastened together with the screw in a fastening region composed at least of a first extremity and a screw mount, the plate-shaped member and the screw mount form an interval. The interval includes a first interval adjacent to the middle of the case, and a second interval adjacent to the outside of the case. The first interval is larger than the second interval.

8 Claims, 10 Drawing Sheets

5 2b 2 1
2a
4
4a
3 6

FIXING STRUCTURE FOR PLATE-SHAPED MEMBER, AND ELECTRONIC APPARATUS

CROSS-REFERENCE TO RELATED APPLICATION

The present application claims priority from Japanese Application JP2019-167564, the content of which is hereby incorporated by reference into this application.

BACKGROUND OF THE INVENTION

Field of the Invention

The present invention relates to a fixing structure for a plate-shaped member that is housed in a case of an electronic apparatus. The present invention also relates to an electronic apparatus having the fixing structure for the plate-shaped member.

Description of the Related Art

A thin portable terminal is previously known that includes a case and a display panel that are nested together. The display panel typically has a stack of a reinforced front panel, a display layer (containing, for instance, liquid crystals or organic light-emitting diodes), and a back panel (e.g., a glass plate). The back panel of the display panel has low strength in some parts, such as a gap between the back panel and the reinforced panel that results from placement of a drive circuit.

In a conventional portable terminal that includes a thin case and a display panel that are nested together, forming a metal plate integrally in the case enhances the rigidity of the case, thus achieving a steady strength of the portable terminal.

This integral structure of the case and metal plate unfortunately cannot have various components on the backside of the metal plate, unless the case has, in its backside, an opening for mounting these components or unless the metal plate has a large opening.

The case that has, in its backside, an opening for mounting the components requires a configuration for closing the opening. This configuration increases the number of components accordingly, thus rendering the case structure complicated. In addition, the metal plate that has a large opening lowers the rigidity of the case accordingly.

In other words, the metal plate cannot provide sufficient strength in this integral structure of the case and metal plate; consequently, the strength of the portable terminal needs to be enhanced at the cost of thickness reduction of the device or frame narrowing of the display portion to a certain degree.

Japanese Patent No. 5654146 discloses a portable terminal having a structure for solving the above problem. This portable terminal includes a case having a bath-tub shape, a plate-shaped frame, and a display portion. These components are nested together in this order. The plate-shaped frame has, at its perimeter, a standing portion standing toward the display portion. This structure is established by housing a battery, substrate and other various components into the case, then placing the plate-shaped frame over the case, and finally closing the case with the display portion. The portable terminal, which has a standing portion at the perimeter of the plate-shaped frame, has a large gap between the display portion and the plate-shaped frame. This gap of the portable terminal avoids the plate-shaped frame from proximity to or contact with the display portion.

SUMMARY OF THE INVENTION

Reducing the distance between the plate-shaped frame and the display portion is difficult in the aforementioned conventional technique, because of the standing portion at the perimeter of the plate-shaped frame. This unfortunately obstructs thickness reduction of the electronic apparatus.

One possible way to reduce the thickness of the electronic apparatus is eliminating the standing portion from the perimeter of the plate-shaped frame to reduce the distance between the plate-shaped frame and the display portion. Unfortunately in this way, the various components within the case or a deformation in the case (in particular, an inward warp) pushes up at least part of the plate-shaped frame toward the display portion. As a result of this problem, the gap between the display portion and the plate-shaped frame can disappear to cause partial proximity or contact between the display portion and the plate-shaped frame. Such partial proximity or contact between the display portion and the plate-shaped frame unfortunately causes malfunctions in the display portion, such as display unevenness and functional failure.

To solve these problems, it is an object of one aspect of the present invention to provide, but not limited to, a fixing structure for a plate-shaped member that can avoid operational failure resulting from the proximity or contact between the plate-shaped member and a component, while reducing the thickness and weight of an electronic apparatus, and improving flexibility in selection of the plate-shaped member.

A fixing structure for a plate-shaped member according to one aspect of the present invention includes a case of an electronic apparatus, and a plate-shaped member disposed within the case. The case has a screw mount where the case and the plate-shaped member are fastened together with a screw. The plate-shaped member is spaced away from a component of the electronic apparatus. Herein, the component is closer to the outside of the case than the plate-shaped member is. The plate-shaped member has a first extremity provided with a first inserting portion that is adjacent to the end of the plate-shaped member and receives the screw. Before the plate-shaped member and the case are fastened together with the screw in a fastening region composed at least of the first extremity and the screw mount, the plate-shaped member and the screw mount form an interval in the fastening region. Herein, the interval includes a first interval adjacent to the middle of the case in the fastening region, and a second interval adjacent to the outside of the case in the fastening region. In addition, the first interval is larger than the second interval.

The aspect of the present invention can avoid operational failure in the components resulting from the proximity or contact between the plate-shaped member and the components, while reducing the thickness and weight of the electronic apparatus, and improving flexibility in selection of the plate-shaped member.

DETAILED DESCRIPTION OF THE INVENTION

Figure 1:
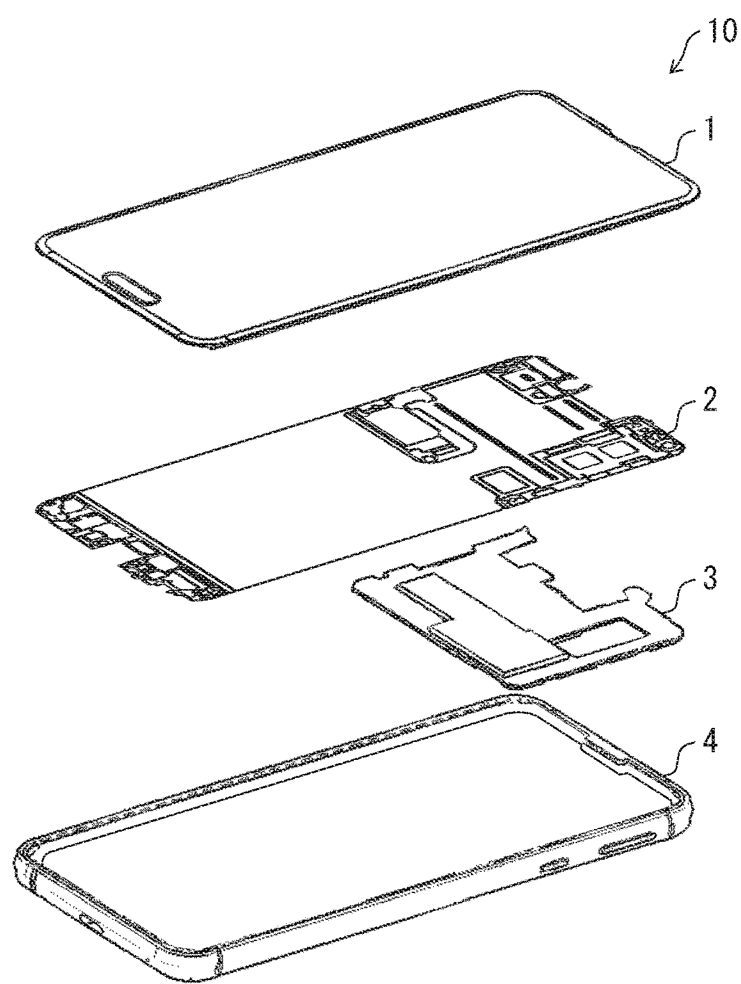
FIG. 1 is an exploded perspective view of the schematic configuration of an electronic apparatus according to one aspect of the present invention.

Preferred embodiments of the present invention will be described with reference to the drawings. FIG. 1 is an exploded perspective view of the schematic configuration of a smartphone (i.e., electronic apparatus) 10 according to one aspect of the present invention. As illustrated in FIG. 1, the smartphone 10 at least includes a display portion (i.e., component) 1, a plate-shaped member 2, a substrate 3, and a case 4. Although this preferred embodiment describes the smartphone 10 as an example of an electronic apparatus, any electric apparatus may be used. Another example of the electronic apparatus is various electronic apparatuses each having a display screen, including a mobile phone, a laptop personal computer (PC), a tablet terminal, an e-book reader, and a personal digital assistant (PDA).

Unless otherwise specified, the front, back, up, and down directions of the smartphone 10 are hereinafter defined as follows: the display portion 1 is in the front direction, the case 4 is in the back direction (or on the backside), the substrate 3 is in the up direction, and the opposite side of where the substrate 3 is located is the down direction.

Figure 2:
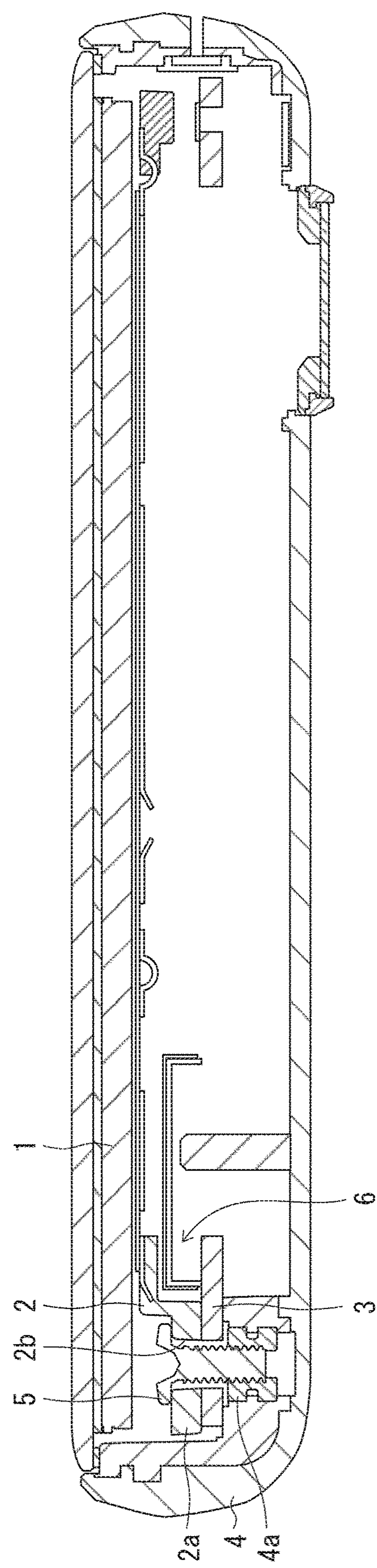
FIG. 2 is a vertical cross-sectional view of the schematic structure of the electronic apparatus taken along a plane perpendicular to the display screen of a display portion and extending in up and down directions.

FIG. 2 is a cross-sectional view of the schematic structure of the smartphone 10 taken along a plane perpendicular to the display screen of the display portion 1 and extending in the up and down directions. As illustrated in FIG. 2, the smartphone 10 at least includes a screw 5 and various components 6 in addition to the display portion 1, the plate-shaped member 2, the substrate 3 and the case 4. The plate-shaped member 2 has a first extremity **2*a*. As illustrated in FIG. 2, the first extremity 2*a* and the substrate 3 are fastened together with the screw 5 via a screw hole disposed in a screw mount 4*a* of the case 4. Although the fixing structure for the plate-shaped member 2 in a fastening region 8 composed at least of the first extremity 2*a* and the screw mount 4*a* is a feature of the smartphone 10** according to this preferred embodiment, this characteristic structure is omitted from the drawing for the purpose of clarification.

The display portion 1, although in this preferred embodiment including organic light-emitting diodes (OLEDs) arranged in a planar manner, may be composed of a liquid-crystal panel for instance. The display portion 1 includes a glass panel to which a display device on the front surface of the smartphone 10 is attached. This glass panel protects the display device. The display portion 1 is one of the components of the smartphone 10 that are closer to the outside of the case 4 than the plate-shaped member 2 is. Other than the display portion 1, any component may be provided that is closer to the outside of the case 4 than the plate-shaped member 2 is and is spaced away from the plate-shaped member 2.

For instance, the plate-shaped member 2 is composed of a stamped and bent metal plate. The plate-shaped member 2 is partly made of resin formed through insertion molding. The plate-shaped member 2 has an approximately rectangular shape extending in a direction along the plane of the opening the case 4. The plate-shaped member 2 is spaced away from the display portion 1 and has a small gap between the display portion 1 and the plate-shaped member 2. The first extremity **2*a* having a first inserting portion 2*b* that is disposed near the end of the plate-shaped member 2 and receives the screw 5. Examples of the first inserting portion 2*b* include a circular hole and a U-shaped hole. The plate-shaped member 2 is fastened to the case 4 with the screw 5 after the various components 6 are housed in the case 4**.

The substrate 3 includes a circuit component that provides various functions, such as display and input-and-output. The substrate 3 also includes a connector connected to the display portion 1 via a flexible cable. The case 4 in this preferred embodiment is made of resin, and is in the form of a bath tub having an opening in its one surface and having a housing space inside that is shallower than the diameter of the opening. It is noted that the case 4 may not be made of resin. The case 4 may be made of metal for instance. Alternatively, the case 4 may be made of integrally-molded metal and resin.

The opening of the case 4 has an almost rectangular shape, which has two sides larger than the other two sides. The shape of the case 4 is not limited to such a bath tub. The screw 5 is used for fastening the plate-shaped member 2 to the case 4 after the various components 6 are housed in the case 4. The various components 6 may be any components, including a central processing unit (CPU), a memory, a battery terminal, a built-in battery, a continuity spring or GND reinforced spring that is mounted on the substrate 3, and various flexible cables. The portable terminal device in this preferred embodiment includes the display portion 1, the plate-shaped member 2, the substrate 3 and the case 4 nested in this order from the front side (i.e., from above in FIG. 1). The plate-shaped member 2 and the case 4 are separable and nestable.

Figure 3:
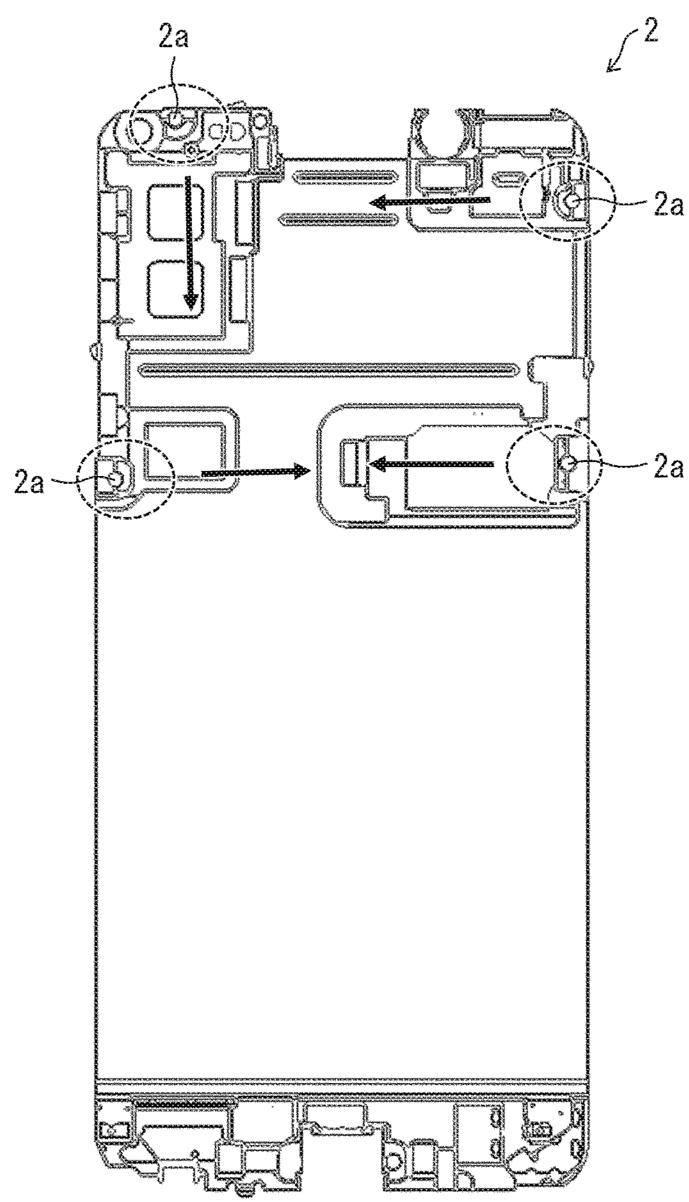
FIG. 3 illustrates the structure of the back surface of a plate-shaped member disposed within a case of the electronic apparatus.

FIG. 3 illustrates the structure of the back surface of the plate-shaped member 2 within the case 4 of the smartphone 10. In this example of the drawing, the first extremity **2*a* at the perimeter of the plate-shaped member 2 has a bottom surface that can have a step, slope and other things, which will be described later on. Such a step and slope on the bottom surface of the first extremity 2*a* extend in a direction where a force causing the plate-shaped member 2 in part or in whole to sink toward the backside of the display portion 1 is transmitted toward the middle of the main body. The arrows in the drawing denote the direction of transmission. The direction of transmission, although being horizontal to or perpendicular to the drawing sheet in FIG. 3, may be oblique to the drawing sheet as long as the force transmits toward the inside of the plate-shaped member 2**.

First Preferred Embodiment

Figure 4:
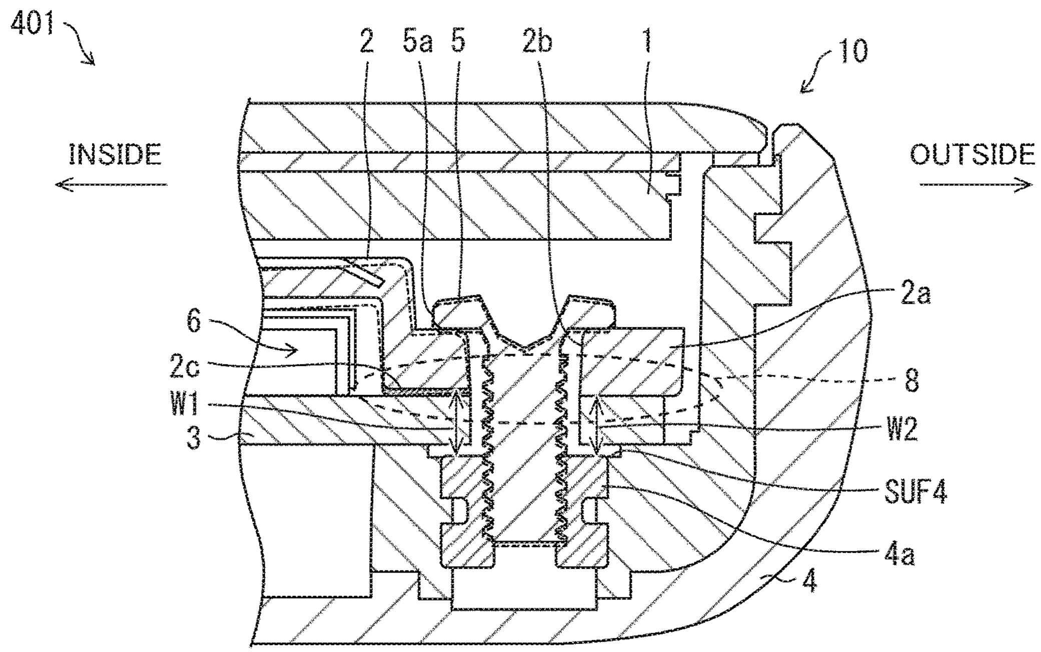
In FIG. 4, Sign 401 illustrates, in cross-sectional view, a fixing structure for the plate-shaped member according to a first preferred embodiment of the present invention; Sign 402 illustrates, in perspective view, the structure of the bottom surface of a first extremity of the plate-shaped member; and Sign 403 illustrates, in cross-sectional view, a partially enlarged part of the fixing structure for the plate-shaped member.
Figure 4:
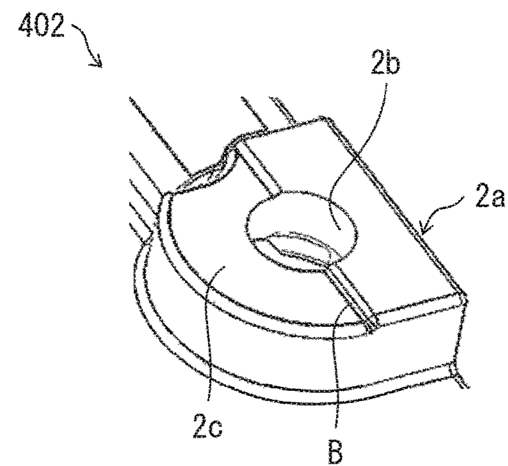
Figure 4:
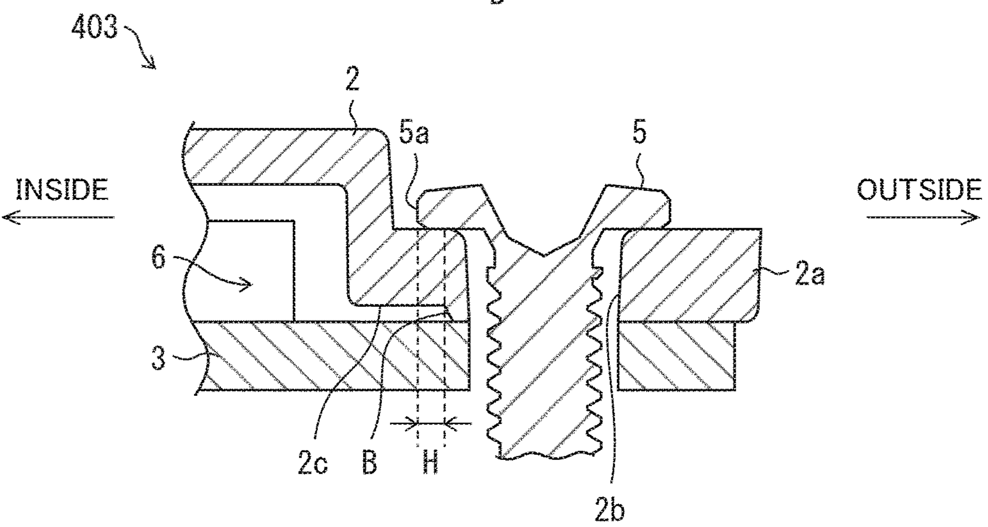

The fixing structure for the plate-shaped member 2 according to a first preferred embodiment of the present invention will be described with reference to FIG. 4. As illustrated in FIG. 4, Sign 401, before the plate-shaped member 2 and the case 4 are fastened together in the predetermined fastening region 8 with the screw 5, the plate-shaped member 2 and the screw mount 4*a* form an interval that includes a first interval W1 adjacent to the middle of the case 4, and a second interval W2 adjacent to the outside of the case 4. Herein, the first interval W1 is larger than the second interval W2. The same holds true for a second preferred embodiment and subsequent preferred embodiments. The predetermined fastening region 8 herein is a region at least including the first extremity 2*a* and the screw mount 4*a*. Each of the first interval W1 and second interval W2 in this preferred embodiment is the distance from the bottom surface of the first extremity 2*a* to a mount surface SUF4 of the screw mount 4*a*.

In the above configuration, the plate-shaped member 2, when fastened to the case 4 with the screw 5, sinks deeper toward the screw mount 4*a* along with approach to the inside of the plate-shaped member 2. This configuration can avoid proximity or contact between the plate-shaped member 2 and the display portion 1 after the fastening together of the plate-shaped member 2 and the case 4, without requiring a wide space between the plate-shaped member 2 and the display portion 1 or without increasing the thickness of the plate-shaped member 2 to improve its rigidity. This configuration can avoid component operational failure resulting from the proximity or contact between the plate-shaped member 2 and the display portion 1, while reducing the thickness and weight of the smartphone 10, and improving flexibility in selection of the plate-shaped member 2.

FIG. 4, Sign 402 illustrates, by way of example only, the structure of the bottom surface of the first extremity 2*a* of the plate-shaped member 2 in perspective view. The example of this drawing shows a first step 2*c* having a boundary B disposed in almost the middle of the bottom surface of the first extremity 2*a*. Where the boundary B of the first step 2*c* is located will be detailed. The boundary B of the first step 2*c* refers to the interface between a part of the bottom surface of the first extremity 2*a* where the first step 2*c* is located and the rest of the bottom surface.

FIG. 4, Sign 403 illustrates, in cross-sectional view, a partially enlarged part of the fixing structure for the plate-shaped member 2 according to this preferred embodiment. As illustrated in the drawing, before the plate-shaped member 2 and the case 4 are fastened together with the screw 5, the first step 2*c* is disposed on the bottom surface of the first extremity 2*a* so that the first interval W1 is larger than the second interval W2 (c.f., also FIG. 4, Sign 401). In addition, the boundary B of the first step 2*c* with the screw 5 inserted in the first inserting portion 2*b* is closer, by a distance H, to the outside of the case 4 than a side end surface 5*a* of the head of the screw 5 is. Herein, the side end surface 5*a* is adjacent to the end of the plate-shaped member 2.

In the above configuration, the first step 2*c*, which is disposed on the bottom surface of the first extremity 2*a* and has the boundary B in a predetermined place, renders the first interval W1 larger than the second interval W2 before the plate-shaped member 2 and the screw mount 4*a* are fastened together with the screw 5. The plate-shaped member 2, when fastened to the case 4 with the screw 5, accordingly sinks deeper toward the screw mount 4*a* along with approach to the inside of the plate-shaped member 2. As a result, the plate-shaped member 2 and the case 4 after fastened together are set as denoted by a broken line shown in FIG. 4, Sign 401. This can avoid proximity or contact between the plate-shaped member 2 and the display portion 1.

Second Preferred Embodiment

A second preferred embodiment of the present invention will be described. For convenience in description, components having the same functions as those described in the foregoing preferred embodiment will be denoted by the same signs and will not be elaborated upon here. This holds true for the remaining preferred embodiments.

Figure 5:
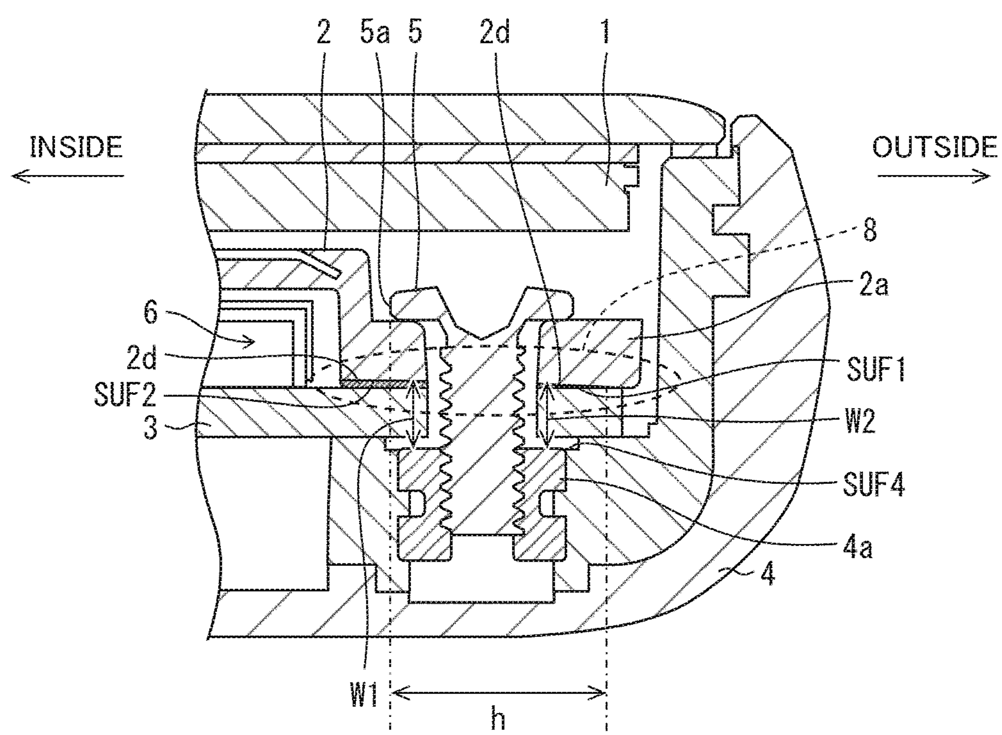
FIG. 5 is a cross-sectional view of the fixing structure for the plate-shaped member according to a second preferred embodiment of the present invention.

In the fixing structure for the plate-shaped member 2 according to this preferred embodiment, the first extremity 2*a* has a bottom surface provided with a slope 2*d* at least partly inclined toward the display portion 1, as illustrated in FIG. 5. The slope 2*d* renders the first interval W1 larger than the second interval W2 before the plate-shaped member 2 and the case 4 are fastened together with the screw 5. The first interval W1 in this preferred embodiment is the distance from a bottom surface SUF2 of the first extremity 2*a* to the mount surface SUF4 of the screw mount 4*a*. In addition, the second interval W2 in this preferred embodiment is the distance from a bottom surface SUF1 of the first extremity 2*a* to the mount surface SUF4 of the screw mount 4*a*.

In the fixing structure for the plate-shaped member 2 according to this preferred embodiment, the slope 2*d* has a side adjacent to the outside of the case 4. This side is closer, by a distance h, to the outside of the case 4 than the side end surface 5*a* of the head of the screw 5 is, with the screw 5 inserted in the first inserting portion 2*b*. This configuration renders the first interval W1 larger than the second interval W2 before the plate-shaped member 2 and the case 4 are fastened together with the screw 5. The plate-shaped member 2, when fastened to the case 4 with the screw 5, accordingly sinks deeper toward the screw mount 4*a* along with approach to the inside of the plate-shaped member 2 (c.f., a broken line in Sign 401 of FIG. 4). This sinking can avoid proximity or contact between the plate-shaped member 2 and the display portion 1 after the fastening together of the plate-shaped member 2 and the case 4.

Third Preferred Embodiment

Figure 6:
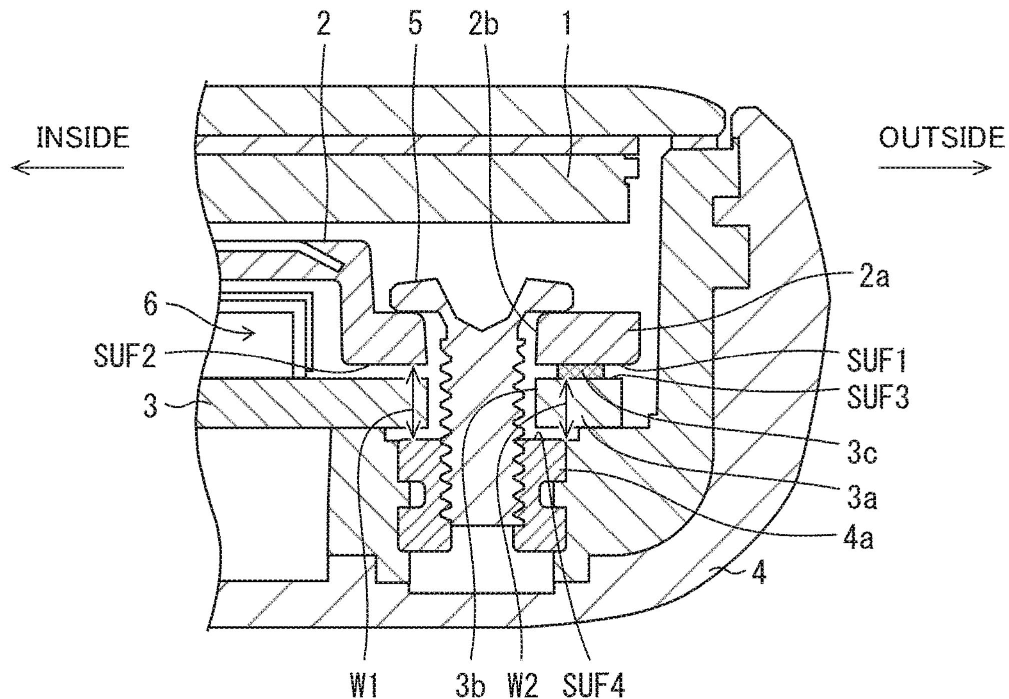
FIG. 6 is a cross-sectional view of the fixing structure for the plate-shaped member according to a third preferred embodiment of the present invention.
Figure 6:
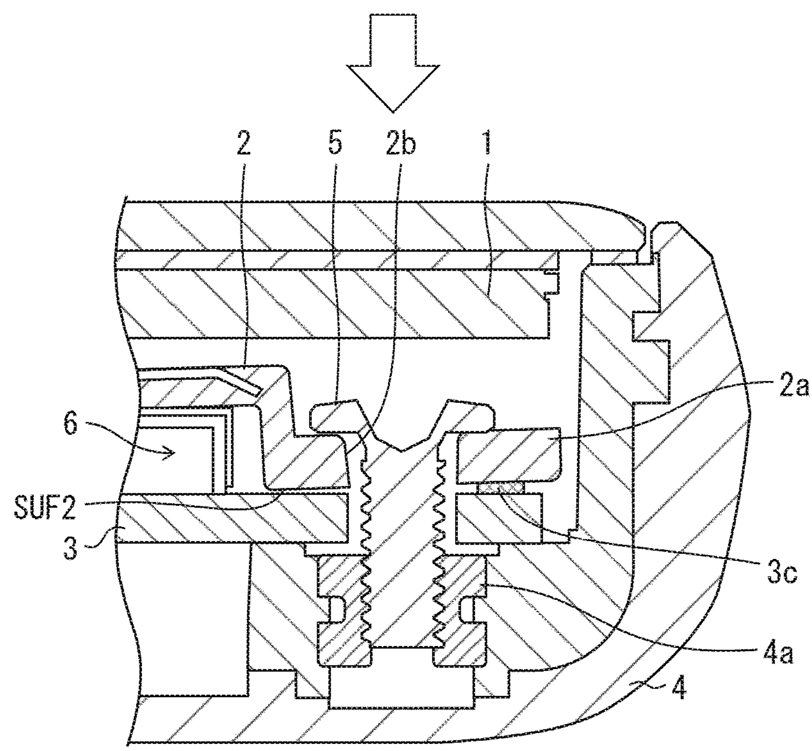

Reference is made to the fixing structure for the plate-shaped member 2 according to a third preferred embodiment. As illustrated in FIG. 6, the fixing structure further includes the substrate 3 disposed between the screw mount 4*a* and the plate-shaped member 2. The substrate 3 has a second extremity 3*a* disposed in a place corresponding to where the first extremity 2*a* is disposed. The second extremity 3*a* is provided with a second inserting portion 3*b* that receives the screw 5. The second extremity 3*a* is also provided with a second protrusion 3*c* on its counter surface SUF3 facing the bottom surface SUF1 of the first extremity 2*a*. The second protrusion 3*c* is disposed on the counter surface SUF3 and is closer to the outside of the case 4 than the second inserting portion 3*b* is. This second protrusion 3*c* renders the first interval W1 larger than the second interval W2 before the plate-shaped member 2 and the case 4 are fastened together with the screw 5. The first interval W1 in this preferred embodiment is the distance from the bottom surface SUF2 of the first extremity 2*a* to the mount surface SUF4 of the screw mount 4*a*. In addition, the second interval W2 in this preferred embodiment is the distance from the counter surface SUF3 of the second extremity 3*a* to the mount surface SUF4 of the screw mount 4*a*.

This configuration renders the first interval W1 larger than the second interval W2 before the plate-shaped member 2 and the case 4 are fastened together with the screw 5. The plate-shaped member 2, when fastened to the case 4 with the screw 5, accordingly sinks deeper toward the screw mount 4*a* along with approach to the inside of the plate-shaped member 2. This sinking, which brings about a state shown in FIG. 6, down the arrow, can avoid proximity or contact between the plate-shaped member 2 and the display portion 1 after the fastening together of the plate-shaped member 2 and the case 4.

Fourth Preferred Embodiment

Figure 7:
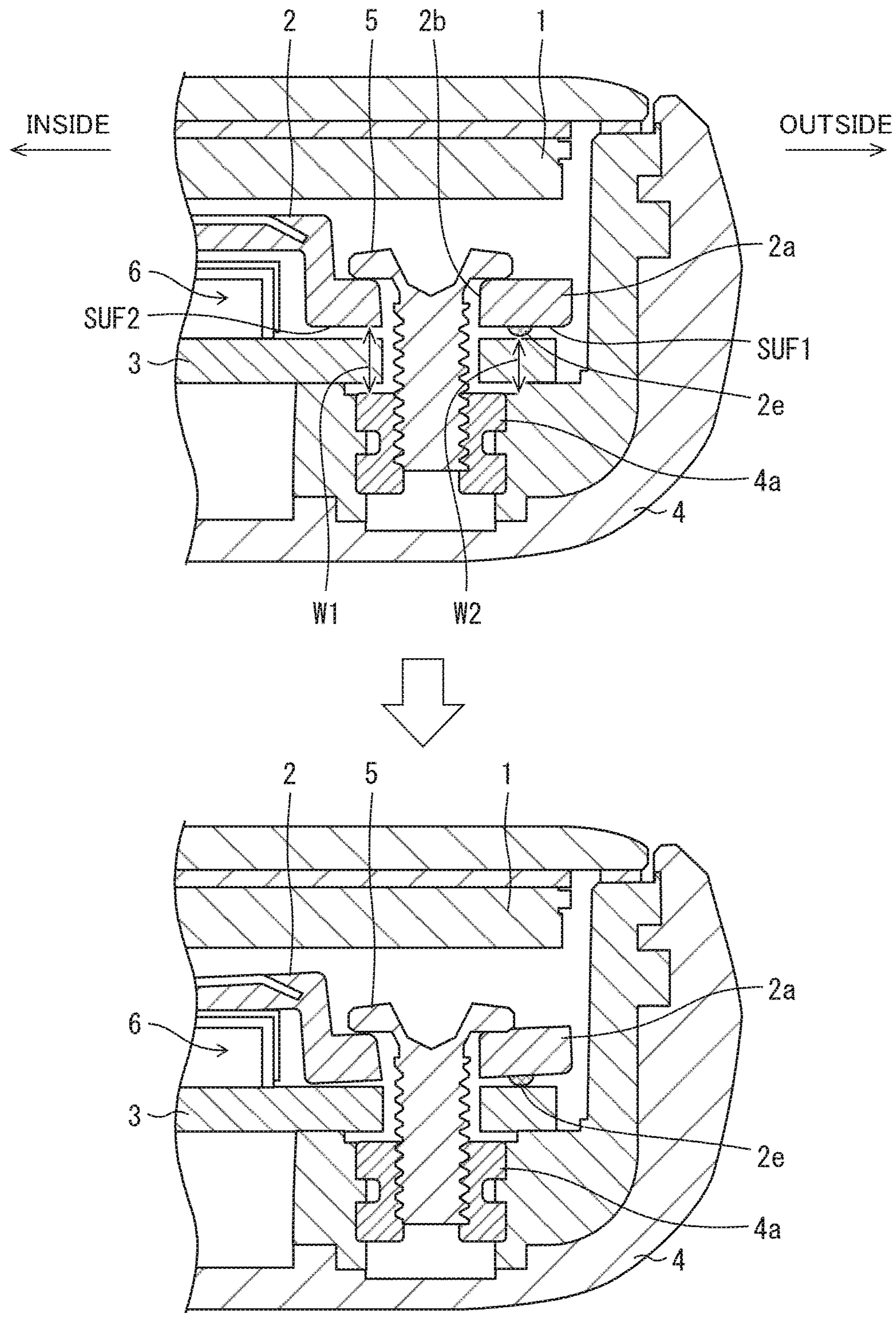
FIG. 7 is a cross-sectional view of the fixing structure for the plate-shaped member according to a fourth preferred embodiment of the present invention.

Reference is made to the fixing structure for the plate-shaped member 2 according to a fourth preferred embodiment. As illustrated in FIG. 7, the first extremity 2*a* is provided with a first protrusion 2*e* on the bottom surface SUF1 closer to the outside of the case 4 than the first inserting portion 2*b* is. In the fixing structure for the plate-shaped member 2 according to this preferred embodiment, the first protrusion 2*e* renders the first interval W1 larger than the second interval W2 before the plate-shaped member 2 and the case 4 are fastened together with the screw 5. The first interval W in this preferred embodiment is the distance from the bottom surface SUF2 of the first extremity 2*a* to the mount surface SUF4 of the screw mount 4*a*. In addition, the second interval W2 in this preferred embodiment is the distance from the distal end of the first protrusion 2*e* to the mount surface SUF4 of the screw mount 4*a*.

This configuration renders the first interval W1 larger than the second interval W2 before the plate-shaped member 2 and the case 4 are fastened together with the screw 5. The plate-shaped member 2, when fastened to the case 4 with the screw 5, accordingly sinks deeper toward the screw mount 4*a* along with approach to the inside of the plate-shaped member 2. This sinking, which brings about a state shown in FIG. 7, down the arrow, can avoid proximity or contact between the plate-shaped member 2 and the display portion 1 after the fastening together of the plate-shaped member 2 and the case 4.

Fifth Preferred Embodiment

Figure 8:
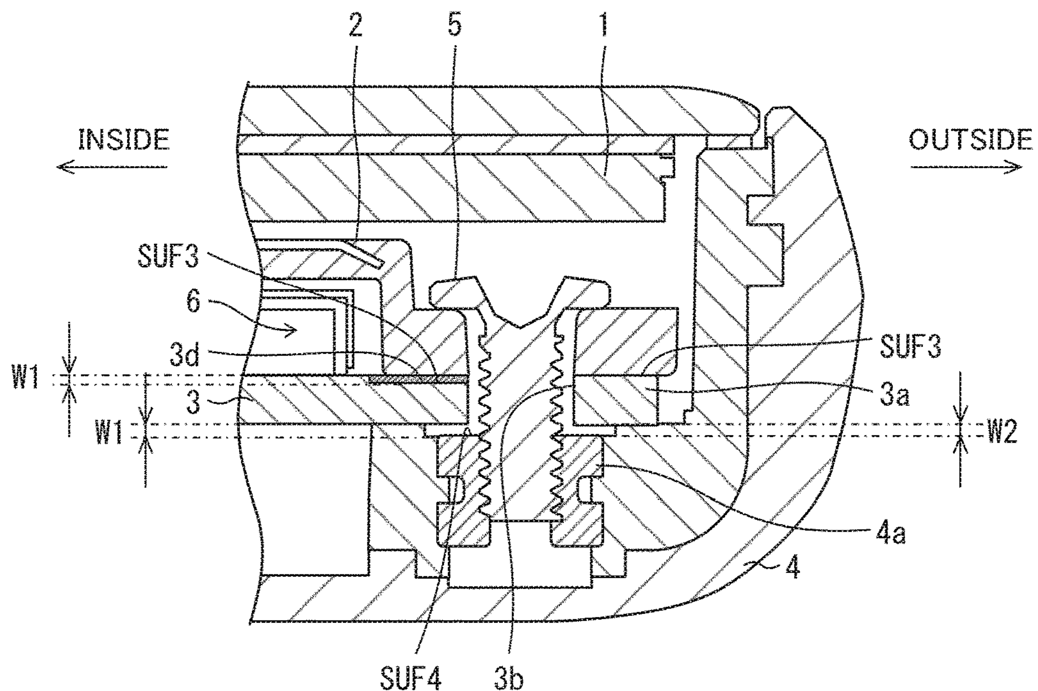
FIG. 8 is a cross-sectional view of the fixing structure for the plate-shaped member according to a fifth preferred embodiment of the present invention.

Reference is made to the fixing structure for the plate-shaped member 2 according to a fifth preferred embodiment. As illustrated in FIG. 8, the fixing structure further includes the substrate 3 disposed between the screw mount 4*a* and the plate-shaped member 2. The substrate 3 has the second extremity 3*a* disposed in a place corresponding to where the first extremity 2*a* is disposed. The second extremity 3*a* is provided with the second inserting portion 3*b* that receives the screw 5. The second extremity 3*a* is also provided with a recess 3*d* in its counter surface SUF3 facing the bottom surface of the first extremity 2*a* (i.e., a surface facing a surface closer to the middle of the case 4 than the second inserting portion 3*b* is). The recess 3*d* is disposed in a portion of the counter surface SUF3 closer to the middle of the case 4 than the second inserting portion 3*b* is. The recess 3*d* renders the first interval W1 larger than the second interval W2 before the plate-shaped member 2 and the case 4 are fastened together with the screw 5.

The first interval W1 in this preferred embodiment is the sum total of the distance of a space between the bottom surface of the first extremity 2*a* and the upper surface of the second extremity 3*a*, and of the distance of a space between the bottom surface of the second extremity 3*a* and the mount surface SUF4 of the screw mount 4*a*. In addition, the second interval W2 in this preferred embodiment is the distance of the space between the bottom surface of the second extremity 3*a* and the mount surface SUF4 of the screw mount 4*a*.

In this preferred embodiment, the interval between the plate-shaped member 2 and screw mount 4*a* in the fastening region 8 refers to the sum total of the distance of spaces formed in any parts of the fastening region 8 between the plate-shaped member 2 and screw mount 4*a*. This sum total distance will be hereinafter referred to as a sum total space. That is, in this preferred embodiment, that the first interval W1 is larger than the second interval W2 may be referred to as that the first interval W1 has more sum total spaces than the second interval W2 does.

This configuration renders the first interval W1 larger than the second interval W2 before the plate-shaped member 2 and the case 4 are fastened together with the screw 5. The plate-shaped member 2, when fastened to the case 4 with the screw 5, accordingly sinks deeper toward the screw mount 4*a* along with approach to the inside of the plate-shaped member 2 (c.f., the broken line in Sign 401 of FIG. 4). This sinking can avoid proximity or contact between the plate-shaped member 2 and the display portion 1 after the fastening together of the plate-shaped member 2 and the case 4.

Sixth Preferred Embodiment

Figure 9:
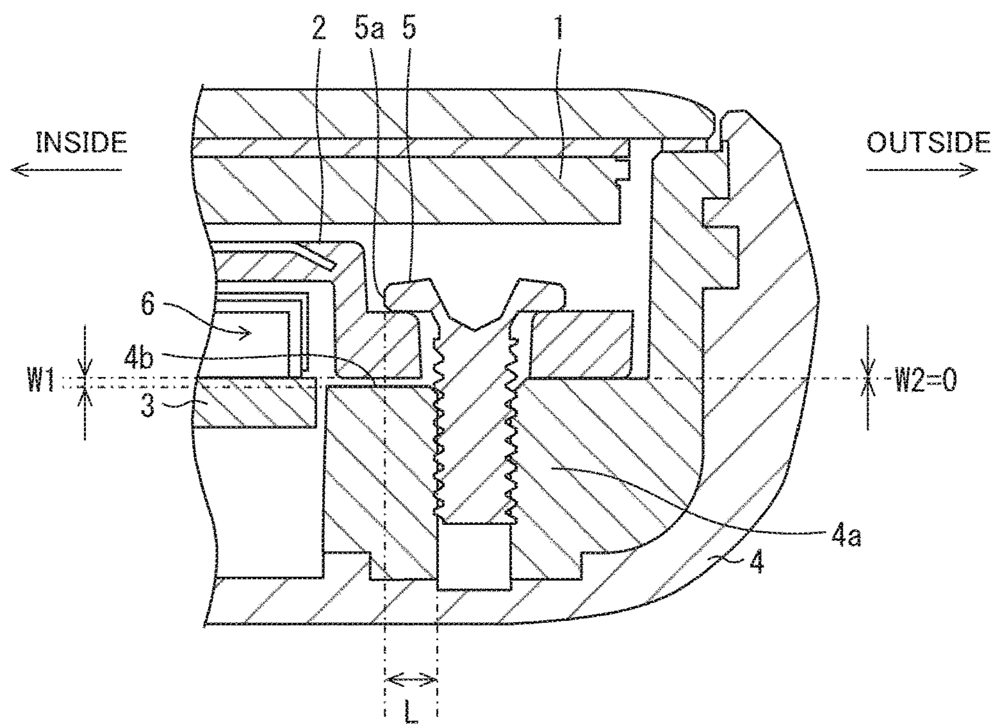
FIG. 9 is a cross-sectional view of the fixing structure for the plate-shaped member according to a sixth preferred embodiment of the present invention.

Reference is made to the fixing structure for the plate-shaped member 2 according to a sixth preferred embodiment. As illustrate in FIG. 9, the mount surface of the screw mount 4*a* is lower in a location close to the middle of the case 4 than in a location close to the outside of the case 4, and this level difference between these two locations results from a second step 4*b*.

The second step 4*b* is provided so that the first interval W1 is larger than the second interval W2 before the plate-shaped member 2 and the case 4 are fastened together with the screw 5. The first interval W1 in this preferred embodiment is the distance between the bottom surface of the first extremity 2*a* and the mount surface of the screw mount 4*a*, in a location that is close to the middle of the case 4 when viewed from the center of the screw 5. In addition, the second interval W2 in this preferred embodiment is the distance between the bottom surface of the first extremity 2*a* and the mount surface of the screw mount 4*a*, in a location that is close to the outside of the case 4 when viewed from the center of the screw 5. Moreover, the second step 4*b* has a boundary that is closer, by a distance L, to the outside of the case 4 than the side end surface 5*a* of the head of the screw 5 is with the screw 5 inserted in the screw hole of the screw mount 4*a*.

This configuration renders the first interval W1 larger than the second interval W2 (in this preferred embodiment, W2=0) before the plate-shaped member 2 and the case 4 are fastened together with the screw 5. The plate-shaped member 2, when fastened to the case 4 with the screw 5, accordingly sinks deeper toward the screw mount 4*a* along with approach to the inside of the plate-shaped member 2 (c.f., the broken line in Sign 401 of FIG. 4). This sinking can avoid proximity or contact between the plate-shaped member 2 and the display portion 1 after the fastening together of the plate-shaped member 2 and the case 4.

Seventh Preferred Embodiment

Figure 10:
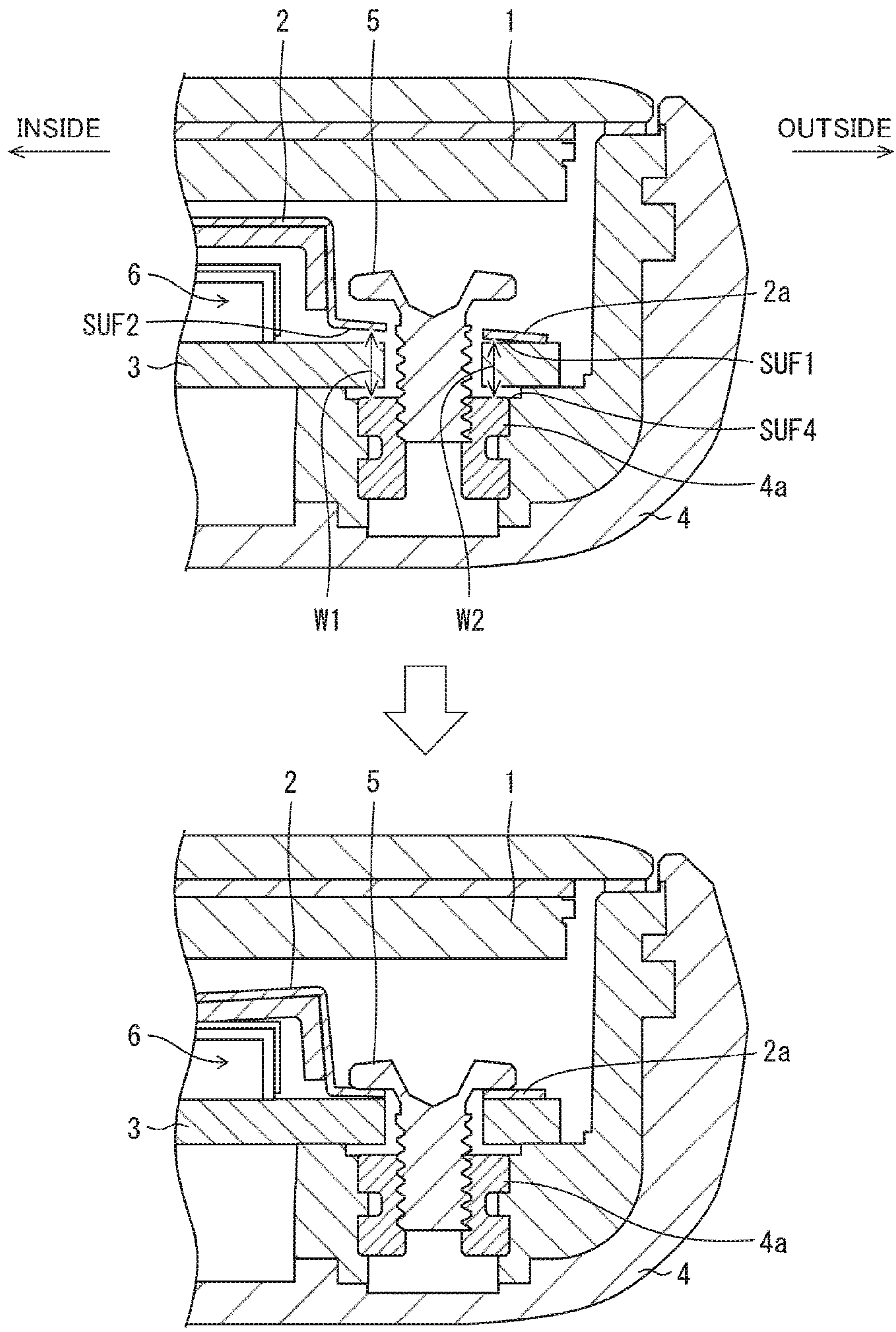
FIG. 10 is a cross-sectional view of the fixing structure for the plate-shaped member according to a seventh preferred embodiment of the present invention.

Reference is made to the fixing structure for the plate-shaped member 2 according to a seventh preferred embodiment. As illustrated in FIG. 10, the first extremity 2*a* is made of metal. The first extremity 2*a* is inclined toward the display portion 1 so that the first interval W1 is larger than the second interval W2 before the plate-shaped member 2 and the case 4 are fastened together with the screw 5. Each of the first interval W and second interval W2 in this preferred embodiment is the distance from the bottom surface of the first extremity 2*a* (i.e., the surface SUF1 or surface SUF2) to the surface SUF4 of the screw base 4*a*.

This configuration renders the first interval W1 larger than the second interval W2 before the plate-shaped member 2 and the case 4 are fastened together with the screw 5. The plate-shaped member 2, when fastened to the case 4 with the screw 5, accordingly sinks deeper toward the screw mount 4*a* along with approach to the inside of the plate-shaped member 2. This sinking, which brings about a state shown in FIG. 10, down the arrow, can avoid proximity or contact between the plate-shaped member 2 and the display portion 1 after the fastening together of the plate-shaped member 2 and the case 4.

Eighth Preferred Embodiment

Figure 11:
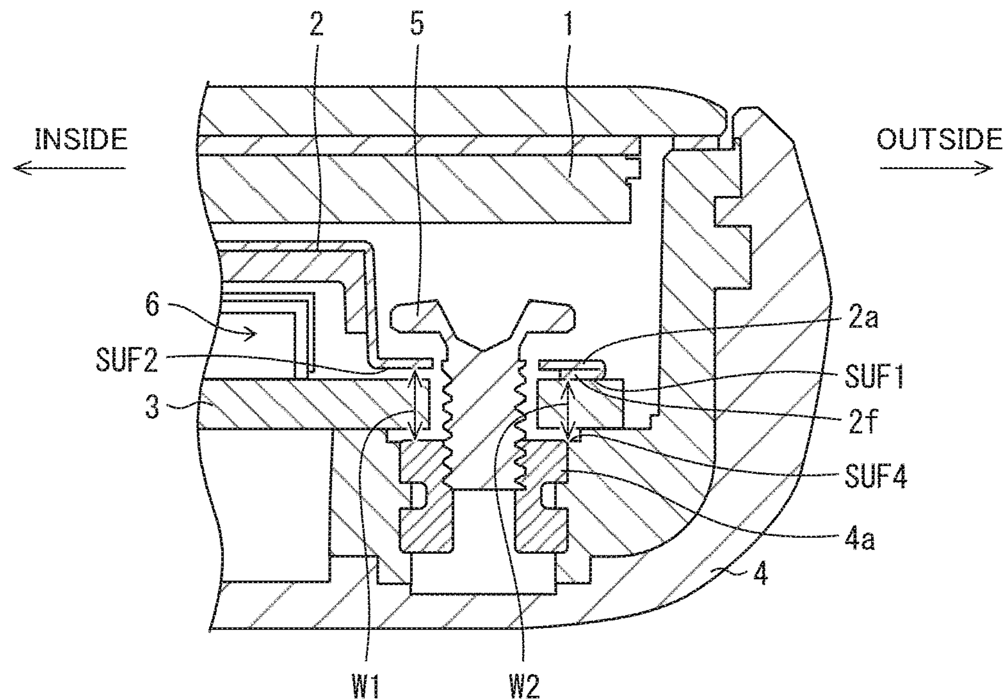
FIG. 11 is a cross-sectional view of the fixing structure for the plate-shaped member according to an eighth preferred embodiment of the present invention.
Figure 11:
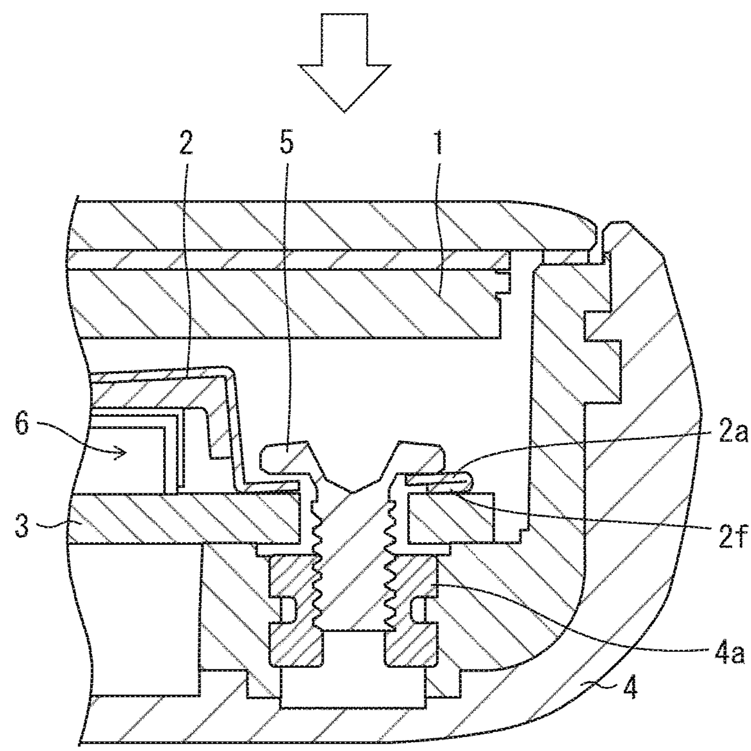

Reference is made to the fixing structure for the plate-shaped member 2 according to an eighth preferred embodiment. As illustrated in FIG. 11, the first extremity 2*a* is made of metal. In the fixing structure for the plate-shaped member 2 according to this preferred embodiment, the first extremity 2*a* has a distal end 2*f* that is bent in a direction remote from the display portion 1 so that the first interval W1 is larger than the second interval W2 before the plate-shaped member 2 and the case 4 are fastened together with the screw 5. Each of the first interval W1 and second interval W2 in this preferred embodiment is the distance from the bottom surface of the first extremity 2*a* (i.e., the surface SUF1 or surface SUF2) to the surface SUF4 of the screw base 4*a*.

This configuration renders the first interval W1 larger than the second interval W2 before the plate-shaped member 2 and the case 4 are fastened together with the screw 5. The plate-shaped member 2, when fastened to the case 4 with the screw 5, accordingly sinks deeper toward the screw mount 4*a* along with approach to the inside of the plate-shaped member 2. This sinking, which brings about a state shown in FIG. 11, down the arrow, can avoid proximity or contact between the plate-shaped member 2 and the display portion 1 after the fastening together of the plate-shaped member 2 and the case 4.

SUMMARY

A fixing structure for a plate-shaped member (2) according to a first aspect of the present invention includes a case (4) of an electronic apparatus (i.e., smartphone 10), and a plate-shaped member disposed within the case. The case has a screw mount (4*a*) where the case and the plate-shaped member are fastened together with a screw. The plate-shaped member is spaced away from a component (i.e., display portion 1) of the electronic apparatus. Herein, the component is closer to the outside of the case than the plate-shaped member is. The plate-shaped member has a first extremity (2*a*) provided with a first inserting portion (2*b*) that is adjacent to the end of the plate-shaped member and receives the screw. Before the plate-shaped member and the case are fastened together with the screw in a fastening region composed at least of the first extremity and the screw mount, the plate-shaped member and the screw mount form an interval in the fastening region. Herein, the interval includes a first interval (W1) adjacent to the middle of the case in the fastening region, and a second interval (W2) adjacent to the outside of the case in the fastening region. In addition, the first interval is larger than the second interval.

Referring to the interval between the plate-shaped member and the screw mount in the fastening region, the above configuration renders the first interval larger than the second interval before the plate-shaped member and the case are fastened together with the screw. The plate-shaped member, when fastened to the case with the screw, accordingly sinks deeper toward the screw mount along with approach to the inside of the plate-shaped member. This sinking can avoid proximity or contact between the plate-shaped member and the component after the fastening together of the plate-shaped member and the case, without requiring a wide space between the plate-shaped member and the component or without increasing the thickness of the plate-shaped member to improve its rigidity. This configuration consequently can avoid component operational failure resulting from the proximity or contact between the plate-shaped member and the component, while reducing the thickness and weight of the electronic apparatus, and improving flexibility in selection of the plate-shaped member.

The fixing structure according to a second aspect of the present invention may be configured, in the first aspect, such that the first extremity (2*a*) has a bottom surface that is provided with a first step (2*c*) so that the first interval (W1) is larger than the second interval (W2) before the plate-shaped member (2) and the case (4) are fastened together with the screw (5). The fixing structure may be also configured such that the first step has a boundary (B) that is closer to the outside of the case than a side end surface (5*a*) of the head of the screw is with the screw inserted in the first inserting portion (2*b*). Herein, the side end surface is adjacent to the end.

In the above configuration, the first step, disposed on the bottom surface of the first extremity and having a boundary in a predetermined location, renders the first interval larger than the second interval before the plate-shaped member and the case are fastened together with the screw. This can avoid proximity or contact between the plate-shaped member and the component after the fastening together of the plate-shaped member and the case.

The fixing structure according to a third aspect of the present invention may be configured, in the first aspect, such that the first extremity (2*a*) has a bottom surface that is a slope (2*d*) that is at least partly inclined toward the component (i.e., display portion 1) so that the first interval (W1) is larger than the second interval (W2) before the plate-shaped member (2) and the case (4) are fastened together with the screw (5). The fixing structure may be also configured such that the slope has a side adjacent to the outside of the case. Herein, the side is closer to the outside of the case than a side end surface (5*a*) of the head of the screw is with the screw inserted in the first inserting portion. Herein, the side end surface is adjacent to the end.

In the above configuration, at least part of the bottom surface of the first extremity is a slope, and the side of the slope adjacent to the outside of the case is disposed in a predetermined location. The configuration thus renders the first interval larger than the second interval before the plate-shaped member and the case are fastened together with the screw. This can avoid proximity or contact between the plate-shaped member and the component after the fastening together of the plate-shaped member and the case.

The fixing structure according to a fourth aspect of the present invention may be configured, in any of the first to third aspects, such that the first extremity (2*a*) has a bottom surface provided with a first protrusion (2*e*) that is closer to the outside of the case (4) than the first inserting portion (2*b*) is so that the first interval (W1) is larger than the second interval (W2) before the plate-shaped member (2) and the case are fastened together with the screw (5).

In the above configuration, the bottom surface of the first extremity is provided with a first protrusion that is closer to the outside of the case than the first inserting portion is. The configuration thus renders the first interval larger than the second interval before the plate-shaped member and the case are fastened together with the screw. This can avoid proximity or contact between the plate-shaped member and the component after the fastening together of the plate-shaped member and the case.

In any of the first to third aspects, the fixing structure according to a fifth aspect of the present invention may further include a substrate (3) disposed between the screw mount (4*a*) and the plate-shaped member (2). The fixing structure may be configured such that the substrate has a second extremity (3*a*) disposed in a place corresponding to where the first extremity is disposed. Herein, the second extremity is provided with a second inserting portion (3*b*) that receives the screw (5). The fixing structure may be also configured such that the second extremity has a counter surface facing the bottom surface of the first extremity. Herein, the counter surface is provided with a second protrusion (3*c*) that is closer to the outside of the case than the second inserting portion in the counter surface is so that the first interval (W1) is larger than the second interval (W2) before the plate-shaped member and the case are fastened together with the screw.

In the above configuration, the counter surface of the second extremity is provided with a second protrusion closer to the outside of the case than the second inserting portion is. This configuration renders the first interval larger than the second interval before the plate-shaped member and the case are fastened together with the screw. This can avoid proximity or contact between the plate-shaped member and the component after the fastening together of the plate-shaped member and the case.

In any of the first to fifth aspects, the fixing structure according to a sixth aspect of the present invention may further includes a substrate (3) disposed between the screw mount (4*a*) and the plate-shaped member (2). The fixing structure may be configured such that the substrate has a second extremity (3*a*) disposed in a place corresponding to where the first extremity (2*a*) is disposed. Herein, the second extremity is provided with a second inserting portion (3*b*) that receives the screw (5). In addition, the second extremity has a counter surface facing the bottom surface of the first extremity. Herein, the counter surface is provided with a recess (3*d*) that is closer to the middle of the case than the second inserting portion in the counter surface is so that the first interval (W1) is larger than the second interval (W2) before the plate-shaped member and the case are fastened together with the screw.

In the above configuration, the counter surface of the second extremity is provided with a recess that is closer to the middle of the case than the second inserting portion. This configuration renders the first interval larger than the second interval before the plate-shaped member and the case are fastened together with the screw. This can avoid proximity or contact between the plate-shaped member and the component after the fastening together of the plate-shaped member and the case.

The fixing structure according to a seventh aspect of the present invention may be configured, in any of the first to fourth aspects, such that the screw mount (4*a*) has a mount surface provided with a second step (4*b*) that is adjacent to the middle of the case (4) so that the first interval (W1) is larger than the second interval (W2) before the plate-shaped member (2) and the case are fastened together with the screw (5). The fixing structure may be also configured such that the second step has a boundary that is closer to the outside of the case than a side end surface (5*a*) of the head of the screw is with the screw inserted in a screw hole of the screw mount. Herein, the side end surface is adjacent to the end.

In the above configuration, the mount surface of the screw mount is provided with a second step that is adjacent to the middle of the case and has a boundary located in a predetermined place. This configuration renders the first interval larger than the second interval before the plate-shaped member and the case are fastened together with the screw. This can avoid proximity or contact between the plate-shaped member and the component after the fastening together of the plate-shaped member and the case.

The fixing structure according to an eighth aspect of the present invention may be configured, in the first aspect, such that the first extremity (2*a*) is made of metal. The fixing structure may be also configured such that the first extremity is inclined toward the component (i.e., display portion 1) so that the first interval (W1) is larger than the second interval (W2) before the plate-shaped member (2) and the case (4) are fastened together with the screw (5).

In the above configuration, the first extremity is made of metal and is inclined toward the component. This configuration renders the first interval larger than the second interval before the plate-shaped member and the case are fastened together with the screw. This can avoid proximity or contact between the plate-shaped member and the component after the fastening together of the plate-shaped member and the case.

The fixing structure according to a ninth aspect of the present invention may be configured, in the first aspect, such that the first extremity (2*a*) is made of metal. The fixing structure may be also configured such that the first extremity has a distal end (2*f*) that is bent in a direction remote from the component (i.e., display portion 1) so that the first interval (W1) is larger than the second interval (W2) before the plate-shaped member (2) and the case (4) are fastened together with the screw (5).

In the above configuration, the first extremity is made of metal and has a distal end bent in a direction remote from the component. This configuration renders the first interval larger than the second interval before the plate-shaped member and the case are fastened together with the screw. This can avoid proximity or contact between the plate-shaped member and the component after the fastening together of the plate-shaped member and the case.

An electronic apparatus (i.e., smartphone 10) according to a tenth aspect of the present invention preferably has the fixing structure for the plate-shaped member (2) according to any of the first to ninth aspects. This configuration can achieve an effect similar to that in the first aspect.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A fixing structure for a plate-shaped member, comprising:

a case of an electronic apparatus; and a plate-shaped member disposed within the case, wherein the case comprises a screw mount where the case and the plate-shaped member are fastened together with a screw, the plate-shaped member is spaced away from a component of the electronic apparatus, the component being closer to an outside of the case than the plate-shaped member is, the plate-shaped member comprises a first extremity provided with a first inserting portion that is adjacent to an end of the plate-shaped member and receives the screw, before the plate-shaped member and the case are fastened together with the screw in a fastening region composed at least of the first extremity and the screw mount, the plate-shaped member and the screw mount form an interval in the fastening region, the interval comprises:

a first interval adjacent to a middle of the case in the fastening region; and a second interval adjacent to the outside of the case in the fastening region, and the first interval is larger than the second interval, the first extremity comprises a bottom surface comprising a slope that is at least partly inclined toward the component so that the first interval is larger than the second interval before the plate-shaped member and the case are fastened together with the screw, and the slope comprises a side adjacent to the outside of the case, the side being closer to the outside of the case than a side end surface of a head of the screw is with the screw inserted in the first inserting portion, the side end surface being adjacent to the end.

2. The fixing structure according to claim 1, wherein the first extremity comprises a bottom surface provided with a first protrusion that is closer to the outside of the case than the first inserting portion is so that the first interval is larger than the second interval before the plate-shaped member and the case are fastened together with the screw.

3. A fixing structure for a plate-shaped member, comprising:

a case of an electronic apparatus; and a plate-shaped member disposed within the case, wherein the case comprises a screw mount where the case and the plate-shaped member are fastened together with a screw, the plate-shaped member is spaced away from a component of the electronic apparatus, the component being closer to an outside of the case than the plate-shaped member is, the plate-shaped member comprises a first extremity provided with a first inserting portion that is adjacent to an end of the plate-shaped member and receives the screw, before the plate-shaped member and the case are fastened together with the screw in a fastening region composed at least of the first extremity and the screw mount, the plate-shaped member and the screw mount form an interval in the fastening region, the interval comprises:

a first interval adjacent to a middle of the case in the fastening region; and a second interval adjacent to the outside of the case in the fastening region, and the first interval is larger than the second interval, the fixing structure further comprises a substrate disposed between the screw mount and the plate-shaped member, the substrate comprises a second extremity disposed in a place corresponding to where the first extremity is disposed, the second extremity being provided with a second inserting portion that receives the screw, and the second extremity comprises a counter surface facing a bottom surface of the first extremity, the counter surface being provided with a second protrusion that is closer to the outside of the case than the second inserting portion in the counter surface is so that the first interval is larger than the second interval before the plate-shaped member and the case are fastened together with the screw.

4. A fixing structure for a plate-shaped member, comprising:

a case of an electronic apparatus; and a plate-shaped member disposed within the case, wherein the case comprises a screw mount where the case and the plate-shaped member are fastened together with a screw, the plate-shaped member is spaced away from a component of the electronic apparatus, the component being closer to an outside of the case than the plate-shaped member is, the plate-shaped member comprises a first extremity provided with a first inserting portion that is adjacent to an end of the plate-shaped member and receives the screw, before the plate-shaped member and the case are fastened together with the screw in a fastening region composed at least of the first extremity and the screw mount, the plate-shaped member and the screw mount form an interval in the fastening region, the interval comprises:

a first interval adjacent to a middle of the case in the fastening region; and a second interval adjacent to the outside of the case in the fastening region, and the first interval is larger than the second interval, the fixing structure further comprises a substrate disposed between the screw mount and the plate-shaped member, the substrate comprises a second extremity disposed in a place corresponding to where the first extremity is disposed, the second extremity being provided with a second inserting portion that receives the screw, and the second extremity comprises a counter surface facing a bottom surface of the first extremity, the counter surface being provided with a recess that is closer to the middle of the case than the second inserting portion in the counter surface is so that the first interval is larger than the second interval before the plate-shaped member and the case are fastened together with the screw.

5. The fixing structure according to claim 1, wherein the screw mount comprises a mount surface provided with a second step that is adjacent to the middle of the case so that the first interval is larger than the second interval before the plate-shaped member and the case are fastened together with the screw, and the second step comprises a boundary that is closer to the outside of the case than a side end surface of a head of the screw is with the screw inserted in a screw hole of the screw mount, the side end surface being adjacent to the end.

6. An electronic apparatus comprising the fixing structure for the plate-shaped member according to claim 1.

7. An electronic apparatus comprising the fixing structure for the plate-shaped member according to claim 3.

8. An electronic apparatus comprising the fixing structure for the plate-shaped member according to claim 4.

* * * * *